April 7, 1942. A. A. JENS 2,278,615

DUAL FLASH WELDING APPARATUS

Filed Nov. 22, 1940 3 Sheets-Sheet 1

Inventor:
Albert A. Jens.
By (signature)
Attorney.

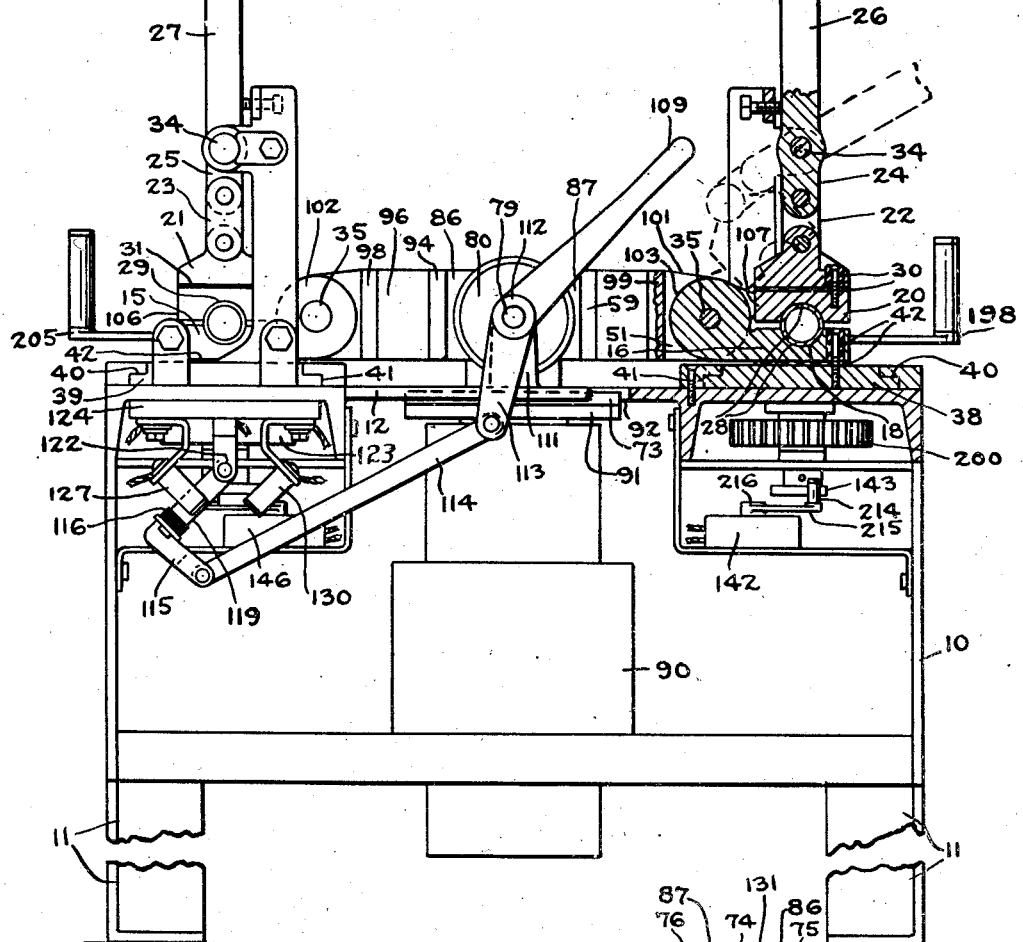

April 7, 1942.   A. A. JENS   2,278,615
DUAL FLASH WELDING APPARATUS
Filed Nov. 22, 1940   3 Sheets-Sheet 3

Inventor:
Albert A. Jens.
By _____
Attorney

Patented Apr. 7, 1942

2,278,615

UNITED STATES PATENT OFFICE 2,278,615

DUAL FLASH WELDING APPARATUS

Albert A. Jens, St. Paul, Minn.

Application November 22, 1940, Serial No. 366,568

3 Claims. (Cl. 219—4)

My invention relates to dual flash-welding apparatus, and has for its object to provide a machine having a current supply and a transformer for delivering a large volume of secondary or welding current together with dual work-holding means, means for supplying the welding current to work held in either of the work-holding means alternatively and not to both at the same time, and means for independently regulating the volume of current to either of said work-holding means.

In connection with what is known as flash welding or arc welding the means for delivering current through the transformer and to the work to be welded is very expensive and exacting, requiring costly and precise forms of apparatus including large conductor areas to obtain suitably efficient results. Yet this complex and costly apparatus in common practice is out of operation much of the time, because following every welding operation it is necessary to remove the welded work and to set up new work for welding purposes, which necessarily consumes much time.

I have discovered that this wasteful procedure may be avoided by providing dual work-holding means in combination with a single current supply together with means for shifting the current from one to the other of these work-holding means and vice versa.

It is a principal object of my invention, therefore, to provide a single source of supply of suitable welding current in association with dual means for holding work, together with means for delivering the welding current to one or the other of said working-holding instrumentalities and including current shifting means which simultaneously cuts off current from one of the work-holding means and causes its delivery to the other work-holding means.

It frequently may happen that the volume of current which will be used on work of one of the work-holding means may be greater or less than the volume of current required for work in the other work-holding means. To meet this difficulty it is an object of my invention to provide independent current control means for regulating the volume of current fed to the respective work-holding means so that the volume may be made great or small for either of them without reference to the volume going to the other work-holding means.

It is a further object of my invention to provide a current shifting means which will, in combination with a single centrally located lever readily accessible from both sides of the machine, at the same time shift the welding current from one work-holding means to another and disconnect the current regulating means from one side and connecting it to the other side.

The full objects and advantages of my invention will appear in connection with the detailed description hereinafter to be given, and the novel features of the invention by which the aforesaid advantageous results are obtained are particularly pointed out in the claims.

In the drawings illustrating an application of my invention in one form:

Fig. 2 is an end elevation view with some parts in section.

Fig. 3 is a sectional view taken on line 3—3 of Fig. 1.

Fig. 4 is a diagrammatic view showing the manner of operation of work-controlling and current-controlling cams.

As illustrated a frame 10 is supported by legs 11 and has thereon a table 12. Upon the table 12 is mounted two pairs of work-holding blocks 13 and 15, and 14 and 16, respectively. The respective pairs of blocks are located on opposite sides of table 12 in alinement and are separated by spaces 17' and 17 respectively.

Figures 1, 5:
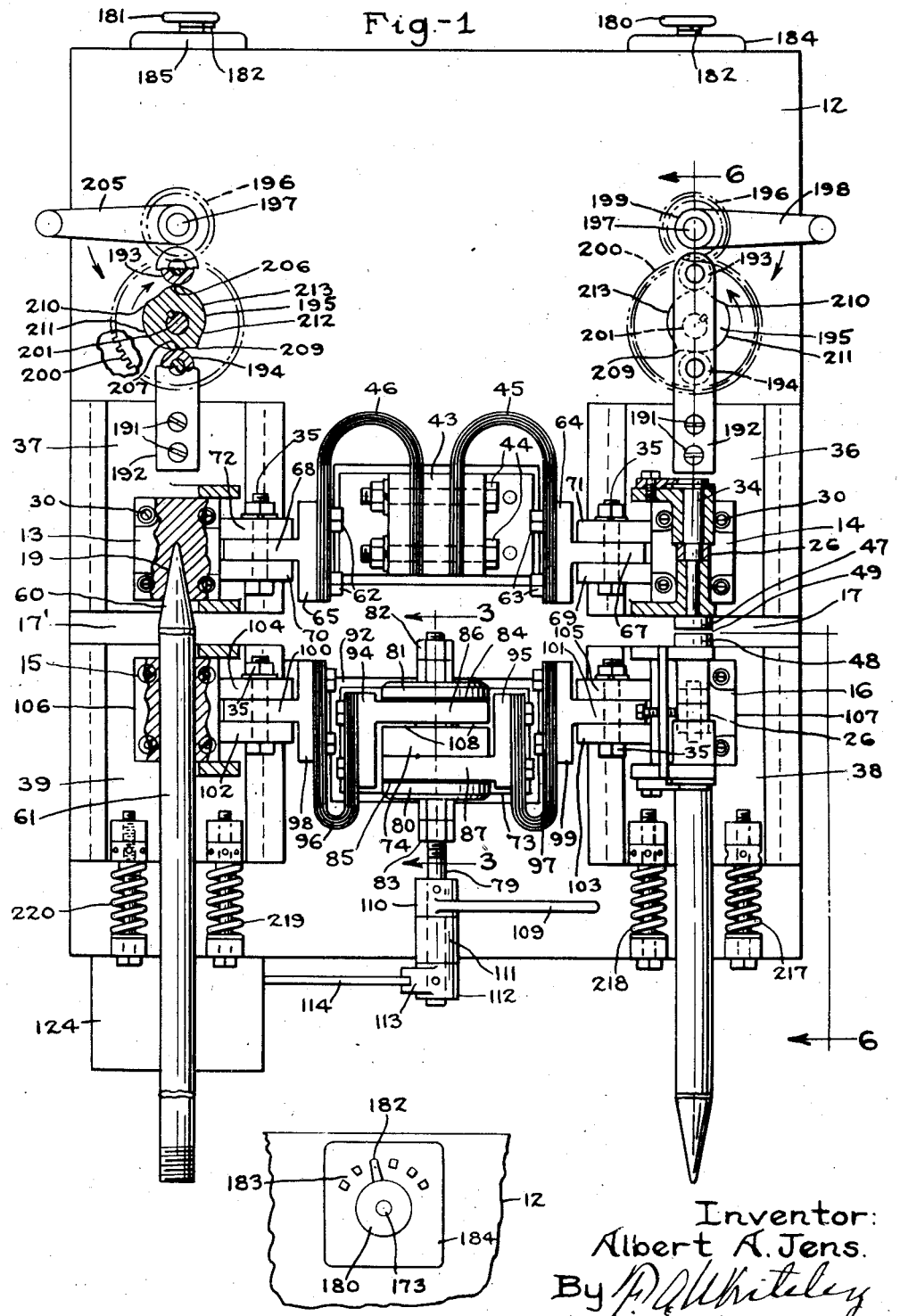
Fig. 1 is a plan view of the entire apparatus with some parts broken away and in section.
Fig. 5 is an elevation view of one of the current regulators for determining volume of flow of current to the transformer and of secondary current from the transformer.

The particular work illustrated in the drawings is the welding of well points and fittings on lengths of pipe for which reason the block 14 is provided with a semi-cylindrical seat 18, Fig. 2, and the block 13 with a semi-conical seat 19, Fig. 1.

In each instance the work-holding vise is completed by swinging blocks 20 and 21, Fig. 2, which are connected by toggle links 22 and 23 with the short arms 24 and 25 of levers 26 and 27. The blocks 20 and 21 are formed with hemispherical seats 28 and 29 shaped to receive the work and are provided with insulation as indicated at 30 and 31 of Fig. 2 of the drawings. The manner of using this vise arrangement is best illustrated at the right of Fig. 2 where the lever 26 is shown pivoted at 34 and the block 20 is shown pivoted at 35. It will be obvious from this arrangement that by swinging the lever 26 to the dotted line position of Fig. 2 the block 20 will be swung away to leave access to the work rest seat 18. Work then resting upon the seat 18 may be withdrawn and new work put in its place, after which the lever 26 will be swung back to its erect position whereby the seat 28 will be caused to engage the work with a strong clamping action to hold it firmly in position during the welding operation.

Bottom blocks 13, 14, 15 and 16 are, as shown in detail in Fig. 2, supported by a series of platen bases 36, 37, 38 and 39 all mounted to slide in ways such as indicated at 40 and 41 of Fig. 2, the sliding platens being insulated from the bottom supporting blocks, as indicated at 42 of Fig. 2. The other parts of the four vises shown, including the upper blocks 20 and 21 and the levers and connecting mechanisms 26 and 27, are all mounted on the platens 36, 37, 38 and 39 respectively and move with these platens. The specific vises or work-holding mechanisms on each platen are of the same nature and are mounted and operate in the same way, though of course they may be shaped differently in any instance so as to hold different types of work.

In assembling the work in practice, in the example shown, the fitting end 47 is first put in vise block 14 and the pipe section 48 is put in vise block 16 and spaced therefrom as indicated at 49 a suitable distance which may be determined by a gage plate for that purpose. The work is then locked in position by operation of the vise levers 26 and is ready for welding. On the other side, in the example shown, the well point 60 is inserted in block 13, pipe 61 is inserted in block 15 and the securing and spacing effected in the same manner.

Upon the transformer terminal 43 extending through the top plate 12 and insulated therefrom is secured by means of bolts 44 two sets of large copper leaf conductors 45 and 46. Bent as shown and in turn secured by bolts 62 and 63 to heads 64 and 65 of T-arms which have their shanks 67 and 68 held between respective pairs of ears 69 and 71 and 70 and 72. The conductors 46 are thus put in circuit with the work-holder mechanisms supported by platens 36 and 37. But this connection of conductors leaves the platen free for sliding movements later to be described because of the flexibility of the curved portions of conductor strips 45 and 46.

Referring to Figs. 1, 2 and 3, a bracket plate 73 is secured to and forms a part of the pole piece of the transformer 90. This bracket plate is provided with a part circular standard 74 and has outwardly extending internally threaded bosses 75 and 76 therethrough which coact with a thread 78 on a shaft 79. Fast on shaft 79 are a pair of circular header plates 80 and 81, Fig. 3, secured in position by sets of nuts 82 and 83. Secured to the header plates 80 and 81 but insulated therefrom, as indicated at 84 and 85 are a pair of contact plates 86 and 87. These plates are provided with cylindrical depressions 88 and 89 which surround the bosses 75 and 76 but are spaced therefrom and also are spaced from the shaft 79 so that at all times the shaft 79 and the end blocks 84 and 85 secured thereto are insulated from the central standard 74, which, as will be later pointed out, is normally in circuit with the secondary current induced in the transformer designated generally by the reference character 90 on Fig. 2. The pole piece 91 of this transformer forms a direct support for the plate 73 which extends through an opening 92, Fig. 2, in the top plate 12, and of course is necessarily at all times in circuit with the secondary or welding current induced by the primary current through the transformer.

The contact plate 86 has thereon a head plate 94 and the contact piece 87 has thereon a head plate 95. To the head plate 94 is secured a conductor 96 formed of a multiplicity of flexible copper strips and similarly to the head plate 95 is secured a similarly formed conductor 97. Conductor 96 is bolted to the head 98 of a T-piece which has its shank 100 secured by bolt 35 to ears 102 and 104 fast on a block 106. Similarly the conductor 97 is bolted to the head 99 of a T-piece whose shank 101 extends between ears 103 and 105 fast on a block 107. It follows from the above arrangement that the contact pieces 86 and 87 both fast on the shaft 79 may be simultaneously shifted and the flexibility of the conductors 96 and 97 will permit such shifting. It also will be apparent from Figs. 1 and 3 that the conductor standard 74 may be contacted either with the contact plate 86 or the contact plate 87. As shown in these figures contact plate 87 is in contact with the conductor standard 74 and contact plate 86 is spaced as indicated at 108 from the conductor 74.

The shifting of the contact plates from one position to the other is effected by means of a hand lever 109 on a hub 110 pinned to the shaft 79 and supported in a bearing on a standard 111, Fig. 1, which in turn is supported on top plate 12. Pinned on shaft 79 is also the hub 112 of a lever arm 113 which is connected by a link 114 with an arm 115 fast on an insulating block 116, Figs. 2 and 7, which carries a series of switch contacting arms 117 118, and 119 which are severally pivoted to standards 120, 121 and 122 depending from a switch block 123 carried by a frame extension 124, Figs. 1, 2 and 7.

Figure 7:
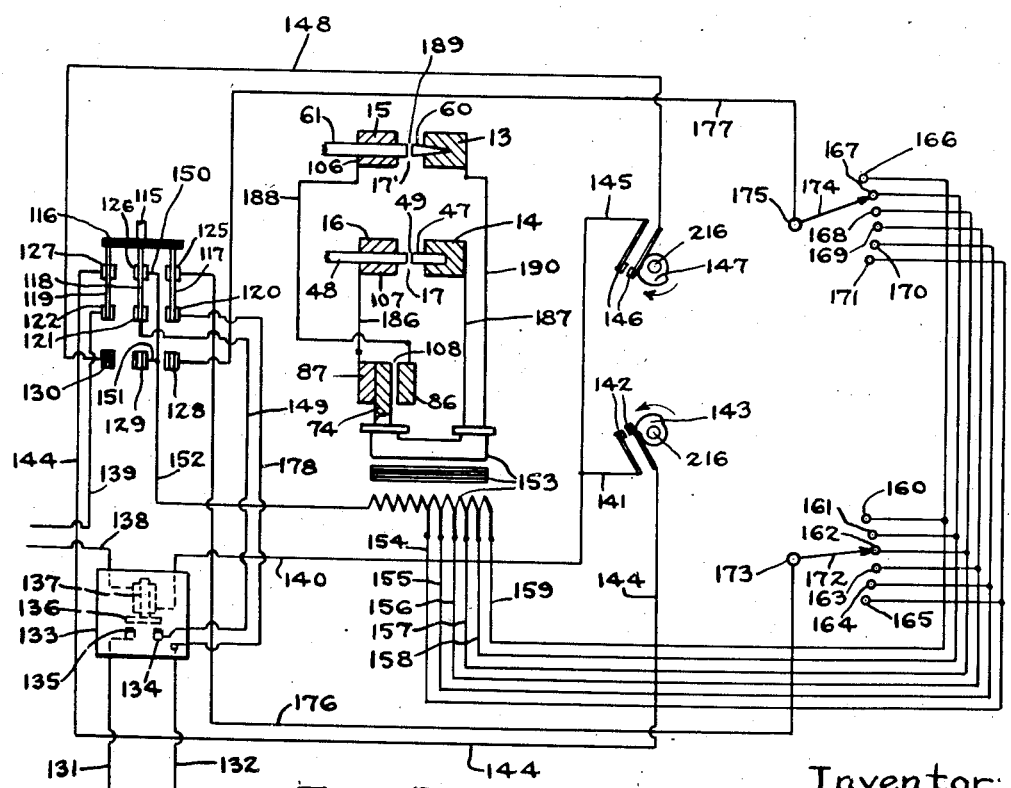
Fig. 7 is a wiring diagram showing the various connections for selectively effecting the welding at dual work-holding points.

As shown in Fig. 7, the contact arms 117, 118 and 119 are in conducting engagement with switch posts 125, 126 and 127 whereby a regulated volume of current by operation of the switch causes conducting connections to be effected for delivering a regulated amount of current to the transformer for effecting a regulated flow of secondary or welding current to one of the work-holding means.

A second set of contact posts 128, 129 and 130 is adapted to be engaged by switch contact arms 117, 118 and 119 when the handle 109 is thrown to its opposite position, as appears very clearly from Figs. 2 and 7. Swinging the handle in that manner will rotate the worm or thread 78 on shaft 79 within the threaded opening 77 with the result that contact blocks 86 and 87 are simultaneously moved to take contact block 87 out of contact with the conducting standard 74 and bring the face of contact block 86 into engagement with said central conducting block, the movement being such as to close the gap 131, Fig. 3, between the faces of contact block 86 and standard 74.

Thus the swinging of the lever 109 from the position of Fig. 2 to its maximum position in the other direction will simultaneously shift contact of the induced secondary or welding circuit from the work-holding means at the left of Fig. 2 to the work-holding means at the right of Fig. 2, and shift the contacts for line control from contact posts 125, 126 and 127 to contact posts 128, 129 and 130 for a purpose and effecting a result as now will be described.

Referring to the wiring diagram of Fig. 7, main welding current, ordinarily 440 volt line current, is delivered from line wires 131 and 132. As shown, wire 131 goes through a switch box 133 where it is normally broken by separated contacts 134, 135 adapted to be closed by a contact piece 136 on a relay 137 operated as follows:

The relay is fed by a second line wire 138 preferably carrying 220 volts, the other, or return wire, being designated as 139. From the relay 137 a wire 140 goes through a branch wire 141 to a normally open switch 142 which is closed and held closed for a suitable period of time by a cam 143, as will be later described. From switch 142 goes a wire 144 which leads to switch block 127 so that with the switch in the position of Fig. 7 the current returns from supporting post 122 through outlet line 139. It follows that with the parts in the position of Fig. 7, whenever switch 142 is closed current passes through relay 137 which closes the contacts 135 and 134 permitting welding current to pass to the transformer as hereinafter described.

Wire 140 also through a branch wire 145 goes to a second switch 146 operated by a second cam 147. Cam 143 is associated with one of the work-holding means and cam 147 with the other work-holding means. When cam 147 is operated to close switch 146 current goes through wire 148 to block 130, and from there when the switch is shifted from the position of Figs. 2 and 7 to make contact with switch 130 through the arm 119 and support 122 to return line wire 139.

Not only are the cam members 143 and 147 independently operative in conjunction with the independent operation of the two sets of work-holding means heretofore described, but only one of said cam-operating means can be effective for passing current when the switch member 115 has been operated to put into circuit the parts for the corresponding work-holding means. That is, cam 143 can operate to pass current when switch 115 is in the position of Figs. 7 and 2 but not when it is in the opposite position. Similarly cam 147 cannot operate to pass current (because of the break between 122 and 130 when the parts are in the position of Figs. 2 and 7), but can become operative when, by manipulation of handle 109, the parts are shifted to make switching contact with contact posts 128, 129 and 130.

Also it will be apparent that when cam 143 or 147 has traveled through a part of a revolution it will first close either switch 142 or switch 146 and then permit their automatic reopening to terminate the flow of current to the work in the work-holder which has been selected. The main welding current going to the transformer also is controlled by the switch 115. This current goes by wire 149 to the standard or supporting post 121 from which it may pass through switch arm 118 either to contact post 126, as shown in the diagram of Fig. 7 and in Fig. 2, or to contact post 129. A branch wire 150 from contact post 126 and a branch wire 151 from contact post 129 goes to a main feed wire 152 leading to the transformer indicated diagrammatically at 153.

From the transformer 153 lead a series of wires 154, 155, 156, 157, 158 and 159. These several wires have sets of branch wires, as shown in Fig. 7, leading to two sets of contacts 160, 161, 162, 163, 164 and 165; and 166, 167, 168, 169, 170 and 171 respectively. A contact finger 172 is on a shaft 173 and coacts with the various contacts 160, 161, 162, 163, 164 and 165. A similar contact finger 174 is on a shaft 175 and is adapted to contact the various contacts 166, 167, 168, 169, 170 and 171. A wire 176 leads from the arm 172 to contact post 125. Similarly a wire 177 leads from the arm 174 to a contact post 128.

It follows that with the parts in the position indicated in the diagram of Fig. 7 the welding circuit through the transformer 153 is closed from lead-in wire 149 through standard 121, switch arm 118, contact post 126, branch wire 150, wire 152 through the transformer thence through wire 157 to contact 162, through contact arm 172 and wire 176 to contact post 125 and through standard 120 back to a wire 178 to the line wire 132.

As shown, if switch 115 is put in reverse position the current will go from contact post 129 through branch wire 151, wire 152 through the transformer 153, through wire 158, contact 167, contact arm 174 and through wire 177 to contact post 128, thence through switch arm 117 and standard 120 through wire 178 back to the line wire 132.

The purpose of this switching arrangement is to provide suitable variations of current volume for the different work-holders so that work requiring large volume of current may be properly handled and welded on one of these work-holders and at the same time, by the mere shift of the switches, work requiring a relatively low volume of current may be done on the other work-holding device. The rheostat contact arms 172 and 174 on shafts 173 and 175 respectively are operated by knobs 180 and 181, Figs. 1 and 5. An indicator needle 182 moves over a dial 183, Fig. 5, in a housing 184 (or 185), the dial having thereon indications for the various contacts 160 to 165 in one rheostat and the contacts 166 to 171 of the other rheostat.

By this means the volume of current supplied to the transformer is determined in advance by the position of contact arms 172 and 174, and the volume of current delivered to the transformer will be regulated and determined thereby and will be transmitted in variable amounts according to the particular work-holding means that may be switched into operation.

The secondary or welding current from transformer 153 may go through either of two circuits as may be desired. In the wiring diagram the circuit closed by contact piece 87 with a surface of contact standard 74 goes through a wire 186 to work-holding block 107 with work 48 therein. The current will be caused to move across gap 49 by means hereinafter described to work 47 in holding block 14 from which the secondary or welding current returns through wire 187.

The other circuit includes the contact piece 86 and a wire 188 which goes to the work-holding block 106 having therein work 61 and across a gap there indicated at 189 to work 60 in holding block 13 and thence through return wire 190.

It will be apparent from the above, that after the volumes of current have been fixed for the respective work-holding means by manipulation of knobs 180 and 181, the current so determined in volume goes to the transformer 153, and the resulting secondary current induced through the circuits just described can be simultaneously shifted from one work-holding means to the other and the volume control of said current also shifted. This shifting is effected merely by swinging lever 109 from its position at one side of the center of the machine to its maximum position at the other side of the center of the machine.

Thus, as indicated in Fig. 1, welding has been completed on the work 60, 61, and the lever 109 has been swung to its other side position causing at the same time contact plate 83 to engage the side surface of contact 74 and causing the switch 115 to shift from the contact posts 128, 129 and 130 to the contact posts 125, 126 and 127, thus causing the selected volume of current when switch 142 is closed to pass to the transformer and effect the welding operation on the work 47 and 48. The reverse operation will be effected by the swinging of handle 109 in the opposite direction through its maximum extent of swing.

Figure 6:
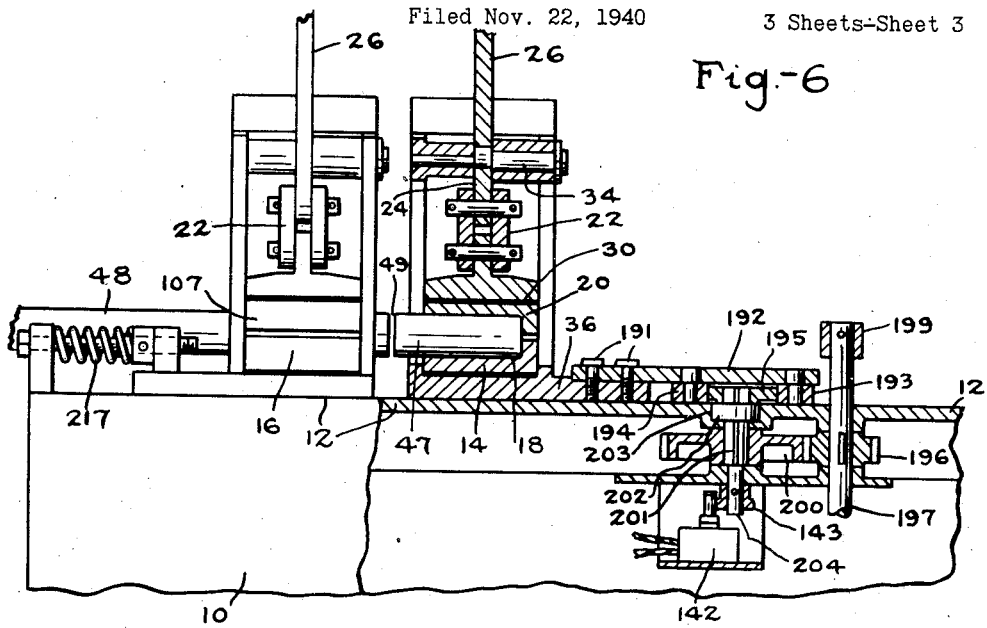
Fig. 6 is a side elevational part sectional view taken on line 6—6 of Fig. 1.

The welding operation itself for either of the work-holding means is as follows: Referring to Fig. 6 the slide 36 carrying the work-holding blocks 14 and 20 and one part of the work 47 has secured thereto by means of screws 191, a top arm 192. This top arm carries a pair of rollers 193 and 194, Figs. 1 and 6, which at all times engage a cam 195 of a shape most clearly outlined in Figs. 1 and 4.

Since these parts are identically the same on the two sides of the machine, the same reference numerals are applied to each of them. A spur gear 196 is on a shaft 197 which carries an operating handle 198 on a hub 199 keyed to shaft 197. The spur gear 196 meshes with a gear 200 on a shaft 201, Figs. 1 and 6. A supporting hub 202 rides in a depression 203 in the top plate 12. The shaft 201 is keyed to the cam member 195 above the support 202 and an extension 204 of shaft 201 has keyed thereto the switch controlling cam member 143.

The above description applies equally well for both sets of work-holding means, a second crank handle 205 being positioned to operate the second work-holding means indicated by blocks 13 and 106.

Having reference to Fig. 1, upper right, and Fig. 4, it will be seen that the cam 195 has its edge surface, in the main, eccentric to the shaft 201. Also that as shown in Figs. 1 and 2, the part of cam edge surface indicated at 206 engageable with roller 193 is at the maximum distance from the center of shaft 201 while the opposite portion 207 engageable with roller 194 is at the minimum distance from the center of shaft 201. In this position the slide 36 (or 37) is drawn away from slide 38 (or slide 39) the maximum distance to leave the gap 49 between portions 47 and 48 of the work, which gap has been determined by means of a suitable gage plate.

The high point 206 of the cam is followed by a depression 208 at one side of the cam with a corresponding elevation 209 at the other side of the cam. Following the depression 208 is a further raised portion 210 of the cam edge and an extended portion 211 gradually approaching closer to the center of the shaft 201, and following the raised portion 209 is a corresponding depressed portion 212 followed by an elongated portion 213 which gradually extends farther and farther from the center of shaft 201.

Also as shown in Fig. 4 as well as Fig. 6, the switch operating cam 143 (or 147) is fast on shaft 204, a continuation of and revolvable with shaft 201. This cam and the cam 195 are shown in Figs. 1 and 4 in the set-up position, that is, the position when the work is put in the workholders and the machine is not operating. As shown, these cams may be turned by hand by either the crank 198 or the crank 205, although obviously automatic means may be employed for turning them. The operation in turning the shaft 201 for either set of cams will be as follows:

First, simultaneously the slide 36 (or 37) will be caused to move forward to close the gap 49 between the parts of the work held on the workholder and the cam 143 will close the appropriate switch so as to send primary current to the transformer and induce secondary or welding current through the particular welding circuit in which it is connected. This will result in the start of welding action. Continued movement of the cam 195 will then first cause the parts of the work to separate slightly and then cause them to approach each other through the major part of a half turn, thus taking care of burn-off at the ends of the work and providing the necessary period of delivery of welding current through operation of the cam 143 on a roller 214 carried by a lever 215 which is on the switch operating shaft 216.

When the pieces of work are caused to approach each other the slide 38 may be pushed backward against the force of springs 217, 218, Fig. 1, and similarly the slide 39 may be pushed back against the force of springs 219, 220. As is clearly indicated in Fig. 4, the cam 143 acts to turn off the welding current before the half-turn of cam 195 is completed so that welding is complete at the first half-turn.

As clearly indicated in Fig. 1, there is a two-to-one gear ratio between pinion 196 and spur gear 200. Hence one complete turn of crank 198 or crank 205 rotates the cam 195 through a half revolution. A second complete turn will restore the parts to the operative position of Figs. 1 and 4. This second turn to bring the parts back to initial position ready to be operated again will ordinarily be made after the work has been released from the vise.

The advantages of my invention will sufficiently appear from the foregoing description. A simple and effective arrangement of parts and control of current enables a single source of electrical current to act on a single transformer to induce secondary or welding current, which in turn may be transmitted to either of two workholding means. At the same time the volume of current for each work-holding means may be set independently for desired variations, and the operation of a single lever will shift from one to the other of said work-holding means, always with the respective current volume as set.

This actually doubles the operating efficiency of the welding apparatus as a whole, for always time must be consumed in taking out finished work and in setting up new work. For the apparatus of my invention this is not lost time, because while removal and set-up is taking place on one side welding is being effected on the other side.

I claim:

1. A duel flash-welding apparatus, comprising a source of primary current, a transformer to which said primary current is fed and by which a secondary or welding current is generated, a plurality of independent circuits for said welding current, an independent work-holding vise with means for holding the work to be welded in each of said circuits, separate means for each of said independent circuits for controlling the volume of primary current going to the transformer, and means for simultaneously breaking one of said circuits and closing the other and for shifting the primary current from passing through one of said volume regulating means and causing it to pass through the other volume regulating means.

2. A dual flash-welding apparatus, comprising a source of primary current, a transformer to which said primary current is fed, and by which a secondary or welding current is induced, a plurality of independent circuits for said welding current, an independent work-holding vise with means for holding the work to be welded in each of said circuits, separate means for each of said independent circuits for controlling the volume of primary current going to the transformer, a second source of current, connections therefrom for throwing in the main primary current to go to the transformer through one or the other of said volume-controlling means, and independent switching means operative for each of said independent circuits for switching on and off said second source of current.

3. A dual flash-welding apparatus, comprising a source of primary current, a transformer to which said primary current is fed and by which a secondary or welding current is induced, a plurality of independent circuits for said welding current, an independent work-holding vise with means for holding the work to be welded in each of said circuits, separate means for each of said independent circuits for controlling the volume of primary current, a second source of current connections therefrom for throwing in the main primary current to go to the transformer through one or the other of said volume-controlling means, independent switching means operative for each of said independent circuits for switching on and off said second source of current, and means operated in conjunction with operation of the work-holding means during welding for automatically operating said last-named switching means.

ALBERT A. JENS.